No. 12,071. REISSUED JAN. 6, 1903.

R. HOWARTH & J. HADEN.

STOPPING DEVICE FOR LOOMS.

APPLICATION FILED MAR. 25, 1902.

WITNESSES:

Wm. S. Bell.

Robert J. Pollitt

INVENTORS,

John Haden, and Richard Haworth by Gartner & Stewart,

Attorneys

THE NORRIS PETERS CO., PHOTO-LITHO., WASHINGTON, D. C.

UNITED STATES PATENT OFFICE.

RICHARD HOWARTH AND JOHN HADEN, OF PATERSON, NEW JERSEY, ASSIGNORS OF ONE-THIRD TO WALTER BAMFORD, OF PATERSON, NEW JERSEY.

STOPPING DEVICE FOR LOOMS.

SPECIFICATION forming part of Reissued Letters Patent No. 12,071, dated January 6, 1903.

Original No. 679,370, dated July 30, 1901. Application for reissue filed March 25, 1902. Serial No. 99,967.

*To all whom it may concern:*

Be it known that we, RICHARD HOWARTH and JOHN HADEN, citizens of the United States, residing at Paterson, in the county of Passaic and State of New Jersey, have invented new and useful Improvements in Stopping Devices for Looms, of which the following is a specification.

This invention relates to looms; and it has for its object to provide an improved mechanism for stopping the batten should any irregularity occur in the action of the shuttle-driving mechanism, whereby upon the beating up of the batten with the shuttles remaining in the sheds damage might be done to the goods.

With this object in view the invention consists in an improved stop-motion of the nature of that above indicated constructed substantially as will be hereinafter described and finally embodied in the clauses of the claim.

The invention will be found fully illustrated in the accompanying drawings, wherein—

Figure 1:
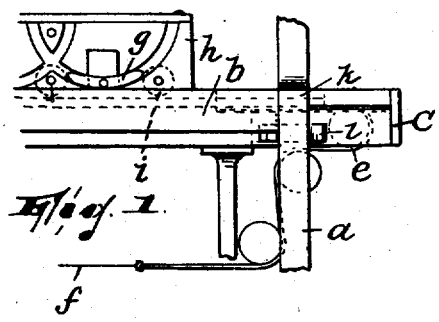
Figure 2:
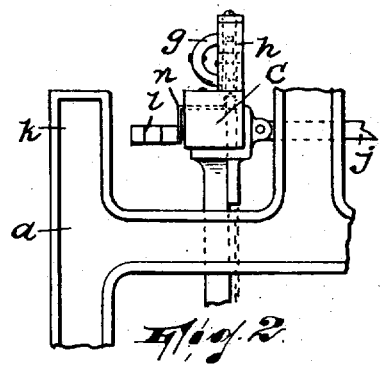
Figure 3:
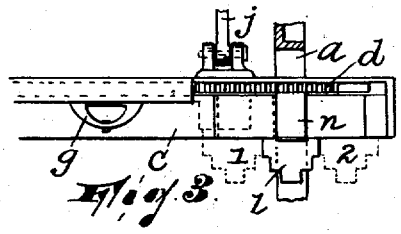
Figure 5:
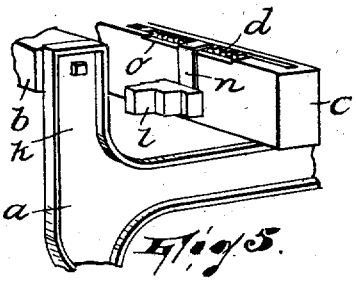
Figure 4:
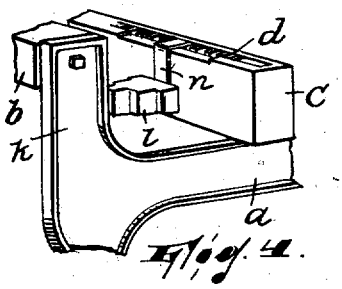
Figure 6:
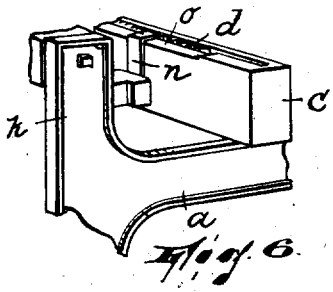
Figure 8:
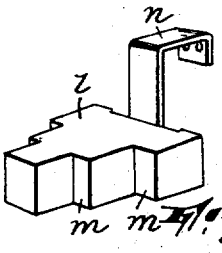
Figure 7:
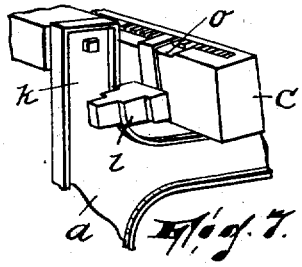

Figures 1, 2, and 3 are front, side, and top plan views, respectively, of that portion of a loom to which our invention has particular reference, showing our invention in operative position in the loom. Figs. 4, 5, 6, and 7 are perspective views illustrating different positions which the parts shown in the first three figures may assume, and Fig. 8 is a detail perspective view of one of two members forming the principal parts of our invention.

In said drawings, *a* designates the loom-frame; *b*, the breast-beam thereof; *c*, the batten; *d*, the shuttle-driving rack; *e*, the rack-strap, and *f* the wire rod which connects with the rack-strap, being adapted to impart through said rack-strap the necessary reciprocating motion to the rack.

*g* represents the shuttles, *h* the shuttle-blocks, and *i* the pinions which transmit motion from the rack to the shuttles.

*j* represents one of the pitmen whereby motion is transmitted from the crank-shaft to the batten.

*k* is an upright of the loom-frame, which supports the breast-beam *b*.

*l* is a block having its front face formed with steps *m*. Said block is arranged in front of the batten, and by means of a bracket or carrier *n* is connected to and participates in the movement of the rack as well as in the movement of the batten as it reciprocates forward and back, carrying the rack.

*o* is simply a recess formed in the top of the batten to accommodate the carrier.

The operation of the mechanism may be described as follows: The block being attached to the rack moves with the latter in its transverse movements, as indicated at 1 and 2 by the dotted lines outlining the block, Fig. 3, and also partakes of the forward-and-backward movement of the batten during the operation of the loom and should the movement of the rack be arrested at any point within the limits of the travel by reason of the breakage of any part of its operating mechanism or otherwise, the block being attached to the rack of course ceases its traverse movement, and the batten being given its forward movement by reason of its connection with the loom-shaft through the pitman *j* continues said forward movement until it is arrested by the block coming into contact with the loom-frame, and as said block is connected through the batten and the pitman *j* with the loom-shaft further revolution of the latter is instantly prevented. The distance the batten can move forward is of course dependent on the distance the end of the block or the steps or shoulders thereof is from the frame, and said distance need only be such as will insure the block clearing the frame during normal operation of the loom, and in practice it is found that the setting or adjusting of the end of the block at a distance of about one-half an inch from the frame provides ample space for the clearance of the frame. Thus the batten can only move forward after a breakage the distance the end of the block or that one of its shoulders or steps in line with the frame is from the batten at the time the breakage occurs to the mechanism before the block will engage the frame and instantly arrest the forward motion of the batten.

The loom-shaft is usually driven by a belt from an overhead shaft to a pulley on the loom-shaft, and practical experience with our device in actual operation has shown that immediately upon the said device engaging the frame of the loom the loom-shaft ceases to operate and the belt continuing to move is thrown off the loom-shaft pulley.

If, however, the belt should fail to leave the loom-shaft pulley when the loom-shaft ceases to revolve, it can only slip thereon without imparting motion to said shaft, as the same is firmly held against revolution by reason of the contact of the block with the frame of the loom, preventing the forward movement of the batten, and as a consequence the forward throw of the pitman *j*, which thus acts as a brake for the loom-shaft. The block is carried during the movement of the rack back and forth in front of the loom-frame and alternately passes at each side of the same during the forward movement of the batten.

Having thus fully described our invention, what we claim as new, and desire to secure by Letters Patent, is—

1. An emergency stop-block for looms having a shuttle-actuating rack, said block having steps or shoulders at each side and a carrier secured thereto for attachment to the rack, substantially as described.

2. In an emergency stop device for looms, the combination, with the loom-frame, the batten and the rack, of a block having steps or shoulders, and a carrier for connecting said block to the rack, whereby the breakage of the mechanism of the loom will cause the block to engage said frame, substantially as described.

3. In a loom, the combination of the batten, a movable part arranged on said batten, the direction of movement of said part on the batten being substantially at right angles to that of the movement of said batten, and impingement elements, one of said elements being movable with said movable part and with the batten and the other being fixed relatively to said first-named element, and one of said elements, also, having its acting face formed with steps, substantially as described.

4. In a loom, the combination of the batten, a movable part arranged on said batten, the direction of movement of said part on the batten being substantially at right angles to that of the movement of said batten, and impingement elements, one of said elements being movable with said movable part and with the batten and one of said elements having its acting face formed with steps, substantially as described.

In testimony whereof we have hereunto set our hands this 13th day of March, 1902.

RICHARD HOWARTH.
JOHN HADEN.

Witnesses:
JOHN W. STEWARD,
JAMES B. NEWTON.